United States Patent [19]
Amano

[11] 3,885,195
[45] May 20, 1975

[54] FLAT PANEL DISPLAY APPARATUS HAVING ELECTRODES ALIGNED WITH ISOLATING BARRIER RIBS

[75] Inventor: Yoshifumi Amano, Zushi, Japan

[73] Assignee: Sony Corporation, Tokyo, Japan

[22] Filed: Dec. 14, 1973

[21] Appl. No.: 424,692

[30] Foreign Application Priority Data
Dec. 21, 1972 Japan.............................. 47-128450

[52] U.S. Cl........... 315/169 TV; 313/188; 313/190; 313/485
[51] Int. Cl........................................... H05b 41/00
[58] Field of Search........ 313/108 R, 108 A, 108 B, 313/109.5, 188, 190, 210, 220, 217, 485; 315/169 TV; 340/336

[56] References Cited
UNITED STATES PATENTS
3,704,052  11/1972  Coleman.................. 315/169 TV X
3,704,386  11/1972  Cola........................... 313/108 B X
3,776,613  12/1973  Esdonk et al. ........... 313/188 R UX Primary Examiner—Paul L. Gensler
Attorney, Agent, or Firm—Hill, Gross, Simpson, Van Santen, Steadman, Chiara & Simpson

[57] ABSTRACT

A flat DC gas discharge panel comprising two opposed glass plates sealed with a space for gas therebetween and having a plurality of anode and cathode electrodes, respectively mounted on opposite plates in a matrix fashion and further including a plurality of parallel insulator ribs which intersect the cathode electrodes at right angles and further provide physical separation between the glass plates and the adjacent cathode segments. A plurality of parallel barrier electrodes are mounted on one of the plates in alignment with the insulator ribs so as to maintain the glow from an illuminated section isolated from adjacent sections.

5 Claims, 5 Drawing Figures

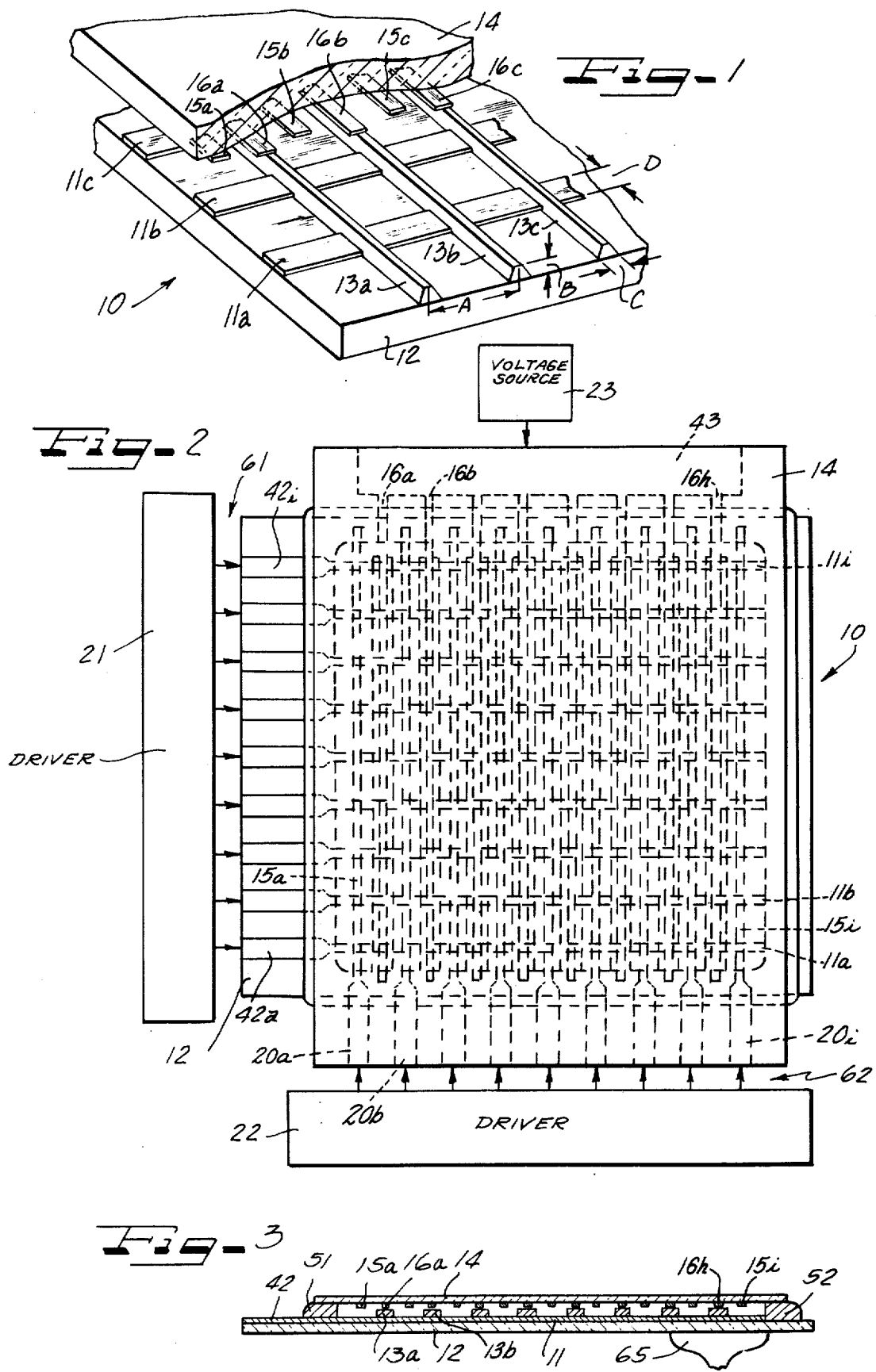

FLAT PANEL DISPLAY APPARATUS HAVING ELECTRODES ALIGNED WITH ISOLATING BARRIER RIBS

BACKGROUND OF THE INVENTION

Field of the Invention

This invention relates in general to DC gas discharge devices and in particular to a new DC gas discharge flat panel display apparatus which has no cross talk and has high density of picture elements with good structural strength and can be easily manufactured.

It has been desirable for a long time to provide flat panel TV display systems which are very thin and which have good picture fidelity and resolution. However, attempts to construct such devices have not been attractive for real time TV displays because of the difficulty of achieving a finely graded gray scale. This is because due to the gas pressure and difficulty in isolating individual gas cells the size and resolution has not been sufficient. Cross talk between adjacent cells has also existed in prior art devices and thus generally such devices have not been suitable for television use.

SUMMARY OF THE INVENTION

The present invention relates to a new DC gas discharge flat panel display device which has no cross talk between adjacent gas discharge cells. This means that there is no gas ion diffusion between adjacent cells. The present invention allows high density and resolution of picture elements while still maintaining good structural strength and can be easily manufactured. The display device of the present invention may be very thin and produces a high quality picture.

The invention can be used in flat TV systems without the use of a cathode ray tube and comprises a X-Y matrix type DC gas discharge display. In a particular example the matrix electrode consisted of 210×280 lines spaced 0.5mm apart to produce a device for 105× 140mm picture size. The overall panel dimensions were 170× 200× 6mm. Barrier electrodes and barrier glass ribs are utilized to prevent electrical and optical cross talk with the anodes and barrier electrodes mounted on the front panel glass plate with 0.25mm spacing. The barriers are connected in common to a suitable DC voltage bias and the rear glass plate supports the cathodes and barrier glass ribs. The barrier glass ribs extend between the two glass plates and are in contact with the barrier electrodes of the front panel thus defining separated gas cells. The glass ribs and barrier electrodes reduce optical as well as electrical cross talk and the two glass plates are sealed and filled with gas, as for example, a mixture of Ne-Ar. Phosphor may be added within the panel so as to achieve black and white or color display. The phosphor may be deposited on the sides of the glass ribs and will be excited by ultraviolet energy from the gas discharge.

The glass ribs add mechanical strength to the display device thus resulting in a compact display system that can be used for television or other display purposes.

Other objects, features, and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a cutaway enlarged perspective view of the flat panel display device of the invention, FIG. 2 is a plan view of the display device of the invention, FIG. 3 is a sectional view of the display device.

DESCRIPTION OF THE PREFERRED EMBODIMENTS

As shown in FIG. 1, the flat panel display panel apparatus of the invention designated by numeral 10 includes a back plate 12 made of insulating material as for example glass upon which are deposited by silk screen method or otherwise a plurality of parallel electrodes 11. The electrodes may be made of, for example, $RuO_2$ and then plated with nickel. A plurality of parallel insulating ribs 13 which may be made of glass are attached to the back plate 12 and extend at right angles to the electrodes 11 as shown. The insulator ribs may be formed by printing and sintering on the glass plate 12.

Figure 4:
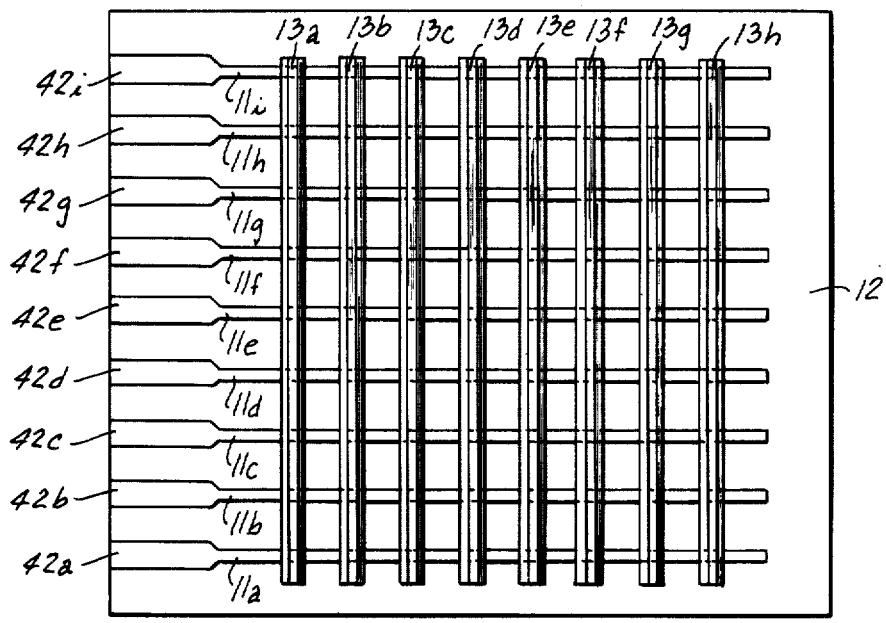
FIG. 4 is a plan view of the bottom plate of the invention.

As shown in FIG. 4 the back plate 12 is shown in plan view and the electrodes 11 are numbered 11a to 11i and at the left end thereof relative to FIG. 4 are provided with contact electrodes 42a through 42i as shown. The insulating ribs 13 are designated 13a through 13h and overlie the electrodes 11 as shown.

The insulator ribs 13 may be tapered as shown in FIG. 1.

The top plate 14 is made of insulating and transparent material as for example glass upon which are formed a pluraltiy of parallel electrodes 15 which extend parallel to the ribs 13 and with an electrode 15 lying between a pair of ribs 13 and the electrodes 15 extend at right angles to the electrodes 11. The electrodes 15 form anode electrodes and may be formed as transparent conductors, by NESA techniques or may be opaque conductors. The electrodes 15 may be vapor deposited and subject to photo engraving.

A plurality of barrier electrodes 16 are formed on the plate 14 parallel to the electrodes 15 and alternately therewith and such that the barrier electrodes are aligned with the ribs 13 as shown. The barrier electrodes 16 may be made in the same manner as the anode electrodes 15.

Figure 5:
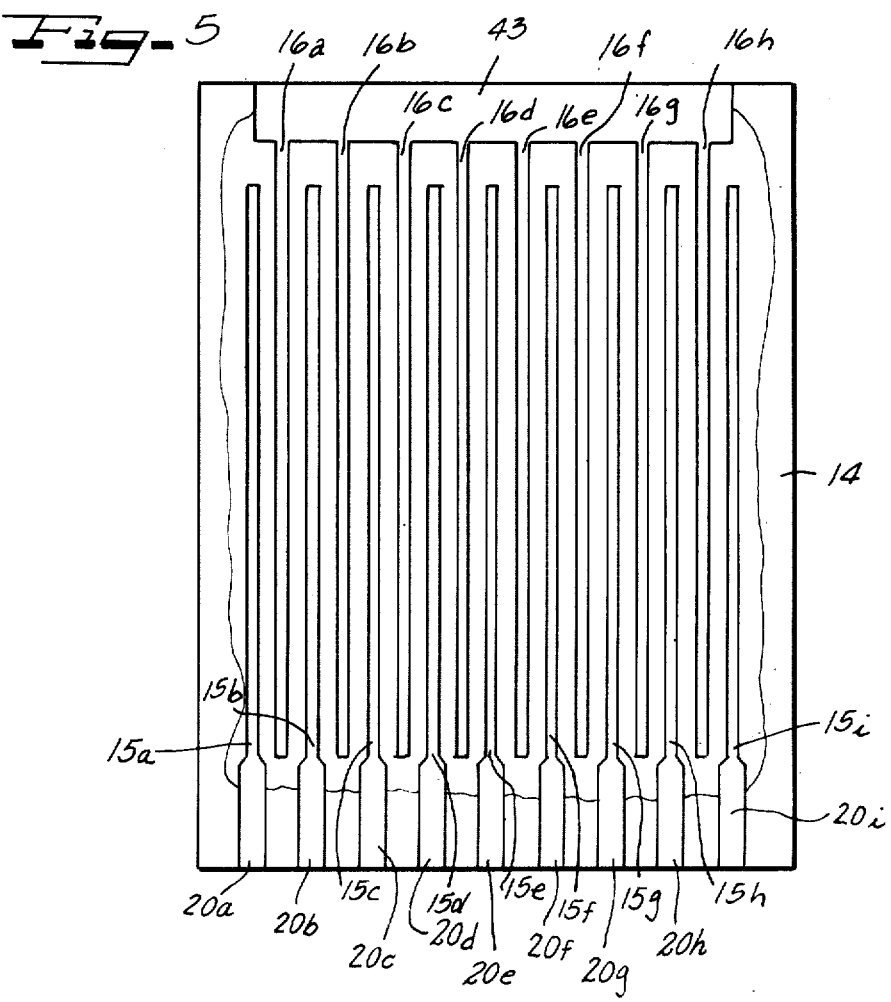
FIG. 5 is a plan view of the upper plate with a portion of the plate cutaway of the invention.

FIG. 5 is a plan view of plate 14 illustrating the anode electrodes 15a through 15i. It is to be noted that at the lower ends relative to FIG. 5 are provided electrical contact regions 20a through 20i for each of the electrodes 15a through 15i.

Also the barrier electrode 16a through 16h are alternately mounted between the electrodes 15a through 15i and are attached to a common feed electrode 43 formed at the upper portion of the plate 14 as shown.

The upper plate 14 and lower plate 12 may be sealed together with glass frit which is illustrated in FIG. 3 by numerals 51 and 52 which extend between the plates 12 and 14 at the outer edges thereof and provide a gas seal. The envelope between the plates 14 and 12 is filled with a suitable gas, as for example, Ne and Nr gas having pressure of 460 Torr.

The glass ribs 13a through 13h extend between the upper and lower plates and isolate portions of the cathodes 11 so as to prevent cross talk between adjacent cells formed in the panel A first driver circuit 21 has a plurality of output leads 61 which are respectively connected to the contact leads 42a through 42i of the cathode electrodes 11a through 11i. The driver 21 supplies either zero volts or 100 volts to the electrodes 11. When 100 volts is supplied to a particular electrode all of the horizontal cells associated with that particular electrode will be off. When zero volts is supplied to a particular electrode 11 a cell associated with such electrode is capable of being illuminated if the proper voltage is simultaneously supplied to the associated anode electrode 15.

A second driver 22 has a plurality of output leads 62 which are connected to the contacts 20a through 20i of anode electrodes 15a through 15i. The driver 22 supplies a voltage in the range of 200 to 250 volts electrode either sequentially or simultaneously to activate a particular cell associated with that anode and supplies a voltage of about 170 volts to those anodes associated with cells not desired to be lighted.

At those portions of the display device where a particular cathode is energized with an on voltage of 0 volts and simultaneously an anode electrode is energized with an on voltage of approximately 200 to 250 volts gas discharge will occur and the glow intensity of such discharge will be proportional to the applied signal voltage, and thus this particular cell will be illuminated.

Those anodes which are not supplied with on voltage are supplied with a voltage of about 170 volts so as to produce a very slight glow.

A DC voltage source 23 is connected to the feed segment 43 and supplies a voltage of approximately 90 to 100 volts to the barrier electrodes 16a through 16h.

Since the cathodes 11 are separated by the insulator ribs 13 the ionized gas is prevented from flowing and diffusing between adjacent cells separated by the ribs 13 which eliminates cross talk. Even if the ribs 13 do not completely separate the adjacent cells the barrier electrodes 16a through 16h which are adjacent to the top of the ribs 13 to which is supplied the intermediate voltage from the voltage source 23 will provide separation between adjacent cells by repelling and annihilating ions.

The glass ribs 13 provide great mechanical strength to a very thin panel display structure and thus the display apparatus can withstand atmospheric pressure even though the apparatus is made very very thin.

In a practical embodiment constructed according to the invention the following dimensions were utilized. The dimension A which is the spacing between the glass ribs 13 was 0.5mm. The width of the base of the ribs 13 is dimension C in FIG. 1 was 0.1mm.

The width of the top of the ribs 13 adjacent to plate 14 were about 0.05mm.

The cathode electrodes 11 were spaced apart 0.5mm and were 0.2mm in width which is dimension D in FIG. 1. The height of the ribs 13 which is dimension B in FIG. 1 was selected to be 0.07 to 0.1mm.

The anode electrodes and barrier electrodes 15 and 16 were made 0.07mm in width. The glass plates 12 and 14 were separated approximately 0.1mm and the thickness of the glass plates 12 and 14 was 3mm.

Phosphor may be deposited on the sides of the ribs 13 so as improve the color and black and white display characteristics. Such phosphors are excited by UV energy from the gas discharge.

The present invention provides an improved display device which is very strong and allows great resolution of information by providing a large number of display cells in a very small space.

Although the invention has been described with respect to preferred embodiments it is not to be so limited as changes and modifications may vary in which within the full intended scope as defined by the appended claims.

I claim as my invention:

1. A flat panel display apparatus comprising: a first insulator plate, a second insulator plate, a plurality of first parallel electrodes attached to said first plate, a plurality of insulating parallel barrier ribs mounted on said first plate so as to cross over said plurality of first electrodes, said barrier ribs intersecting said first electrodes and projecting toward said second plate, a plurality of second parallel electrodes attached to said second plate, said second electrodes parallel with said barrier ribs and positioned between said barrier ribs, the edges of said first and second plates sealed and a gas capable of glowing mounted between said plates, a plurality of barrier electrodes attached to said second plate, and said barrier electrodes positioned between said second electrodes and aligned with said insulating barrier ribs.

2. A flat panel display apparatus comprising: first and second insulating plates with at least one of said plates being transparent, a first plurality of parallel mounted electrodes mounted on one side of said first plate, a plurality of parallel insulating ribs mounted on said one side of said first plate and extending at right angles to said first plurality of electrodes, a second plurality of parallel mounted electrodes mounted on one side of said second plate, said first and second plates joined together with their outer edges sealed such that one of said second plurality of electrodes lie between each pair of said ribs, gas capable of ionization mounted between said insulating plates, and a third plurality of parallel electrodes mounted on said second plate between said second plurality of electrodes and respectively aligned with said insulating barrier ribs.

3. A flat panel display apparatus according to claim 2 wherein said barrier ribs are tapered so that their bases adjacent said first plate are wider than their apexes adjacent said second plate.

4. A flat panel display apparatus according to claim 2 including a pair of drivers respectively connected to said first and second plurality of electrodes to selectively energize regions of said display apparatus.

5. A flat panel display apparatus according to claim 4 including a voltage source connected to said third plurality of electrodes.

* * * * *